(12) United States Patent
Alexander

(10) Patent No.: US 10,963,243 B2
(45) Date of Patent: Mar. 30, 2021

(54) SYSTEM AND METHOD FOR AUTOMATED GENERATION OF SOFTWARE DEVELOPMENT LIFE CYCLE AUDIT DOCUMENTATION

(71) Applicant: JPMorgan Chase Bank, N.A., New York, NY (US)

(72) Inventor: Shawn Wesley Alexander, Pearland, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 16/663,869

(22) Filed: Oct. 25, 2019

(65) Prior Publication Data

US 2020/0133661 A1 Apr. 30, 2020

Related U.S. Application Data

(60) Provisional application No. 62/750,470, filed on Oct. 25, 2018.

(51) Int. Cl.
*G06F 8/73* (2018.01)
*G06F 8/74* (2018.01)
*G06F 11/36* (2006.01)

(52) U.S. Cl.
CPC .............. *G06F 8/73* (2013.01); *G06F 8/74* (2013.01); *G06F 11/3684* (2013.01); *G06F 11/3688* (2013.01); *G06F 11/3692* (2013.01)

(58) Field of Classification Search
CPC .......... G06F 8/73; G06F 8/74; G06F 11/3684; G06F 11/3688; G06F 11/3692
See application file for complete search history.

(56) References Cited

U.S. PATENT DOCUMENTS

| | | | | |
|---|---|---|---|---|
| 5,937,064 A | * | 8/1999 | Eick | G06F 8/75 |
| 7,437,706 B2 | * | 10/2008 | Woodgeard | G06F 8/20 |
| | | | | 717/103 |
| 8,453,112 B1 | * | 5/2013 | Brambley | G06F 8/71 |
| | | | | 717/110 |
| 9,069,646 B2 | * | 6/2015 | Rothley | G06F 8/73 |

(Continued)

OTHER PUBLICATIONS

Morasca et al., "T-DOC: A Tool for the Automatic Generation of Testing Documentation for OSS Products" (Year: 2010).*

(Continued)

*Primary Examiner* — Phillip H Nguyen
(74) *Attorney, Agent, or Firm* — Hunton Andrews Kurth LLP

(57) ABSTRACT

An embodiment of the present invention may be directed to an automated generation of software development life cycle audit documentation tool that enables development teams to move from point-in-time documentation to living documentation while still satisfying software development life cycle (SDLC) audit and risk concerns. An embodiment of the present invention is directed to generating release artifacts for application teams, to avoid costly application development time being used to fill in paperwork. An embodiment of the present invention may run as a Command Line Interface, or as a part of the build pipeline for application teams. This enables development teams to spend their time focusing on delivering high quality business solutions in a rapid fashion.

20 Claims, 4 Drawing Sheets

(56) References Cited

U.S. PATENT DOCUMENTS

| | | | | |
|---|---|---|---|---|
| 2004/0031015 A1* | 2/2004 | Ben-Romdhane | ........ | G06F 8/75 |
| | | | | 717/107 |
| 2006/0059459 A1* | 3/2006 | Grimaldi | ................ | G06F 40/14 |
| | | | | 717/109 |
| 2008/0271012 A1* | 10/2008 | Eykholt | .................... | G06F 8/73 |
| | | | | 717/174 |
| 2017/0083290 A1* | 3/2017 | Bharthulwar | ....... | G06F 11/3688 |
| 2017/0185931 A1* | 6/2017 | Bhojan | .................... | G06F 8/20 |

OTHER PUBLICATIONS

Erdil et al., "Software Maintenance as Part of the Software Life Cycle" (Year: 2003).*

Sommerville, "Software Documentation" (Year: 2001).*

Zanoni et al., "A Semi-Automatic Source Code Documentation Method for Small Software Development Teams" (Year: 2011).*

Buse et al., "Automatically Documenting Program Changes" (Year: 2010).*

Racchetti et al., "Generating Automatically the Documentation from PLC Code by D4T3 to Improve the Usability and Life Cycle Management of Software in Automation" (Year: 2015).*

* cited by examiner the application claims priority to U.S. Provisional Application 62/750,470, filed Oct. 25, 2018, the contents of which are incorporated herein in its entirety.

SYSTEM AND METHOD FOR AUTOMATED GENERATION OF SOFTWARE DEVELOPMENT LIFE CYCLE AUDIT DOCUMENTATION

CROSS REFERENCE TO RELATED APPLICATIONS

The application claims priority to U.S. Provisional Application 62/750,470, filed Oct. 25, 2018, the contents of which are incorporated herein in its entirety.

FIELD OF THE INVENTION

The invention relates generally to a method and system for automated generation of audit documentation and specifically directed to automated generation of software development life cycle audit documentation.

BACKGROUND OF THE INVENTION

Businesses and developers often manually create documentation for each release to satisfy audit and internal risk manager requirements. Such documentation may include Business Requirement Document (BRD), Functional Specification Documents (Functional Specs), Technical Specification Documents (Tech Specs). Currently, the creation of these documents is labor intensive and time consuming. These documents are also obsolete from just about the moment the save button is pressed, as the application features and capabilities are constantly under development.

SUMMARY OF THE INVENTION

According to one embodiment, the invention relates to a system that implements automated generation of software development life cycle audit documentation. The system comprises: a source code repository that stores source code; an interface that communications with one or more users via a communication network; and a computer processor, coupled to the repository and the interactive interface, configured to perform the steps of: retrieving one or more requirements from a business collaboration tool; identifying one or more code changes relating to the one or more requirements from a source code repository to determine functional code that was changed for each requirement; linking business budget and financial milestone data to the one or more requirements to document who approved an associated business investment; accessing code review information from the source code repository to ensure each code change was reviewed and approved by a team member; accessing a test execution and results from a test management system; linking the test execution and results to one or more functional requirements and non-functional requirements; accessing non-functional tests from one or more systems of records; linking the non-functional tests to one or more release and business requirements; applying a template that describes a format of a living documentation that automatically links to a release cycle; and generating the living documentation based on the template.

According to another embodiment, the invention relates to a method that implements automated generation of software development life cycle audit documentation. The method comprises the steps of: retrieving, via an input, one or more requirements from a business collaboration tool; identifying, via a computer processor, one or more code changes relating to the one or more requirements from a source code repository to determine functional code that was changed for each requirement; linking, via the computer processor, business budget and financial milestone data to the one or more requirements to document who approved an associated business investment; accessing, via source code repository, code review information to ensure each code change was reviewed and approved by a team member; accessing, via the computer processor, a test execution and results from a test management system; linking, via the computer processor, the test execution and results to one or more functional requirements and non-functional requirements; accessing, via the computer processor, non-functional tests from one or more systems of records; linking, via the computer processor, the non-functional tests to one or more release and business requirements; applying, via the computer processor, a template that describes a format of a living documentation that automatically links to a release cycle; and generating, via the computer processor, the living documentation based on the template.

The computer implemented system and method described herein provide unique advantages to entities, organizations and other users, according to various embodiments of the invention. With the various embodiments of the present invention, teams may work with living documentation instead of point-in-time documentation where risk, audit, and other external stakeholders to the team may manage what documents are generated, when they are generated, and the format of the documentation without impacting the business or technology teams. Some, or all, of the data required from these teams may be automatically retrieved from systems of record. This reduces inefficiencies and increases visibility and accuracy as the business requirements are linked through to code build and testing. The generated documentation may be stored in various formats including collaboration boards and other interactive interfaces and communication tools. Also documentation may be stored immutably with the application binaries that are being promoted. Further, documentation may be stored separately, or in any combination of storage options. Embodiments may provide full traceability, including by individuals, codes, tests, requirements, and releases. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to generating release artifacts for application teams, to avoid costly application development time being used to fill in paperwork. An embodiment of the present invention may run as a Command Line Interface, or as a part of the build pipeline for application teams. This enables development teams to spend their time focusing on delivering high quality business solutions in a rapid fashion and efficient manner.

Currently, feature teams spend approximately 40 hours or more per release to document Business Requirement Document (BRD), functional specification, technical specification, and operations run book. Much of this time is not reusable in future sprints as these documents are generated at a point-in-time. An embodiment of the present invention enables teams, just prior to release, to access accepted and signed off software feature description from an issue tracking tool that allows bug tracking and agile project management (e.g., epics and stories from JIRA). An embodiment of the present invention further enables the ability to capture technical and functional documentation from a content collaboration tool used to help teams collaborate and share knowledge efficiently, e.g., Confluence, as well as test execution data and results from Application Lifecycle Management (ALM), that represents an integrated system of people, processes, and tools that manage the life an application from concept to retirement.

Figure 1:
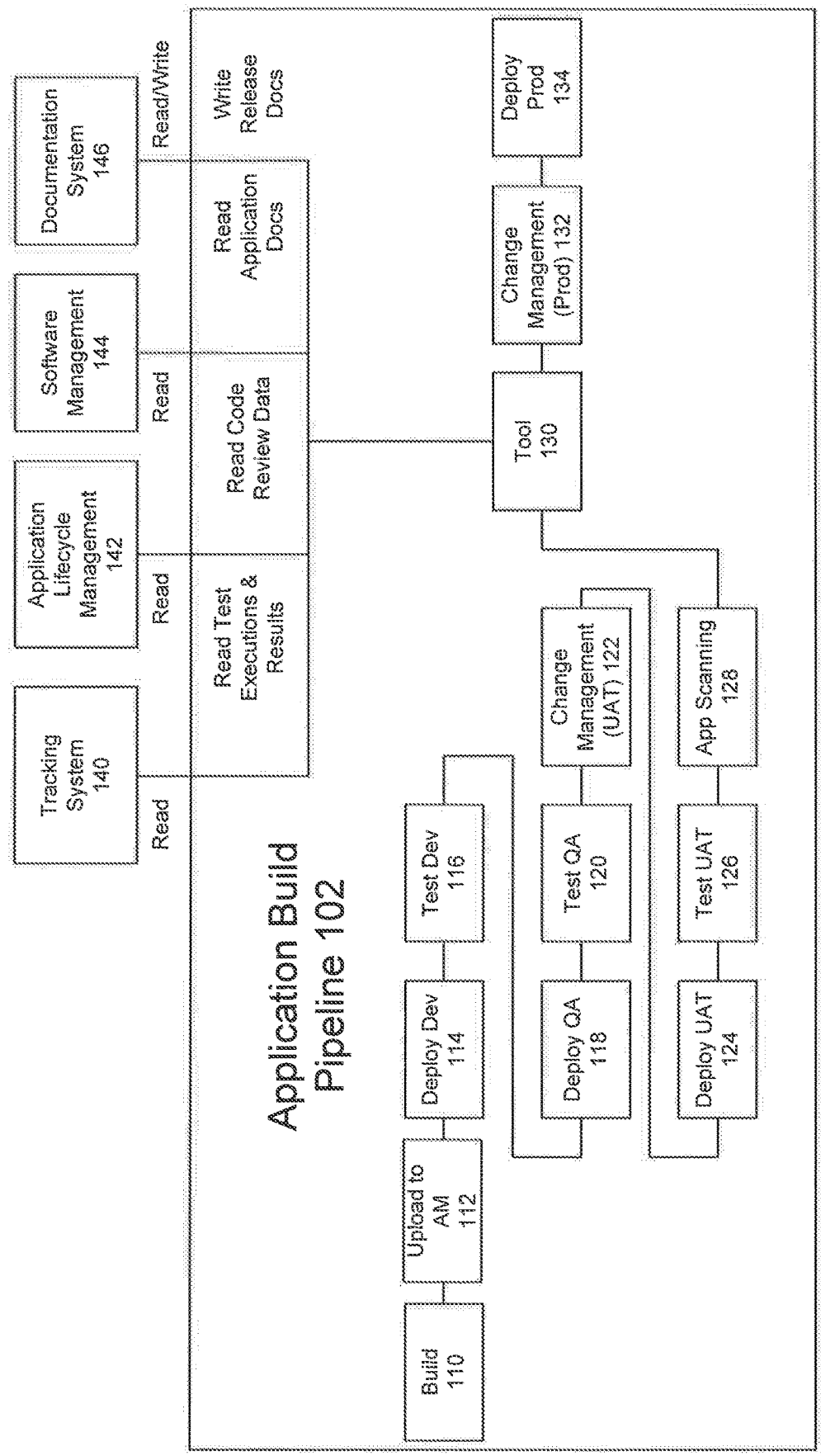
FIG. 1 is an exemplary system architecture, according to an embodiment of the present invention.

FIG. 1 is an exemplary system architecture, according to an embodiment of the present invention. As shown in FIG. 1, an architecture is disclosed according to one embodiment. The system may include, for example, an application build pipeline 102. As shown in FIG. 1, application build pipeline 102 may include Build 110, Upload to Asset Management (AM) 112, Deploy Development 114, Test Development 116, Deploy Quality Assurance 118, Test Quality Assurance 120, Change Management User Acceptance Testing (UAT) 122, Deploy UAT 124, Test UAT 126 and App Scanning 128. AM 112 may represent a repository system that hosts compiled binaries that are the output of a build step. In this example, a workflow may include: compiling Source Code into binaries (e.g., Build 110); uploading binaries to an asset management repository (e.g., AM 112), deploying assets to Dev, QA, UAT, or other environments (e.g., 114, 118, 124). The asset management repository may represent a golden copy of the compiled artifact where deployments may be sourced from.

An embodiment of the present invention may define requirements and assign to a developer. The developer may commit source code to a source code repository. A continuous integration process may compile source code from a source code repository into binary files. The compiled binary may be uploaded from a continuous integration environment to a binary repository. The binary may be deployed from the repository to development environments. Development tests may be executed against the application binary. Binary may be deployed to test environments. An embodiment of the present invention may execute automated tests in a test environment, execute quality code scans, execute cyber security code scans, deploy the binary to test environment and further execute change management tollgate. Additional or fewer processes may be included in the pipeline as is necessary and/or desired.

Once invoked, tool 130 may read information from application data sources—for example, issue and project tracking systems 140 (e.g., JIRA), application lifecycle management systems 142 (e.g., ALM), software management systems 144 (e.g., GIT), and software documentation systems 146 (e.g., Confluence). Other systems, such as financial tracking systems, may be included as necessary and/or desired. For example, the tool may read test executions and results, read code review data, read application documentation, and write release documents.

According to an embodiment of the present invention, the tool may use APIs to access various data sources. Other interfaces and communication mechanisms may be implemented.

Tool 130 may then provide data to the change management 132, and to deployment 134. For example, the documents or change management checks that are generated by the tool may be input into release management tools to satisfy recording audit or risk requirements. Thus, instead of manually attesting to these steps, the generated artifacts may satisfy the checklist in a more precise and accurate manner.

According to an embodiment of the present invention, the tool may be provided with configuration information that details where data is stored in each system of record. The tool may then query each system of record via, for example, APIs, to extract the information required for generating the documents. Once the data is extracted from the system(s) of record, the tool may generate a data graph that links each of the records for each different system of record. Other data, including metadata, may be applied as well. The data graph may then be applied to document templates that describe the format and content needed to satisfy the audit and risk compliance requirements. The tool may then generate the physical documents required and store the documents in an appropriate repository.

According to an embodiment of the present invention, machine learning may be leveraged to identify gaps in meeting risk compliance, or any flags that have been raised with other systems that have the same type of data or content in the data graph in memory. Machine learning enables development teams to identify in advance what risks or concerns may be raised based on the data captured and stored.

Figure 2:
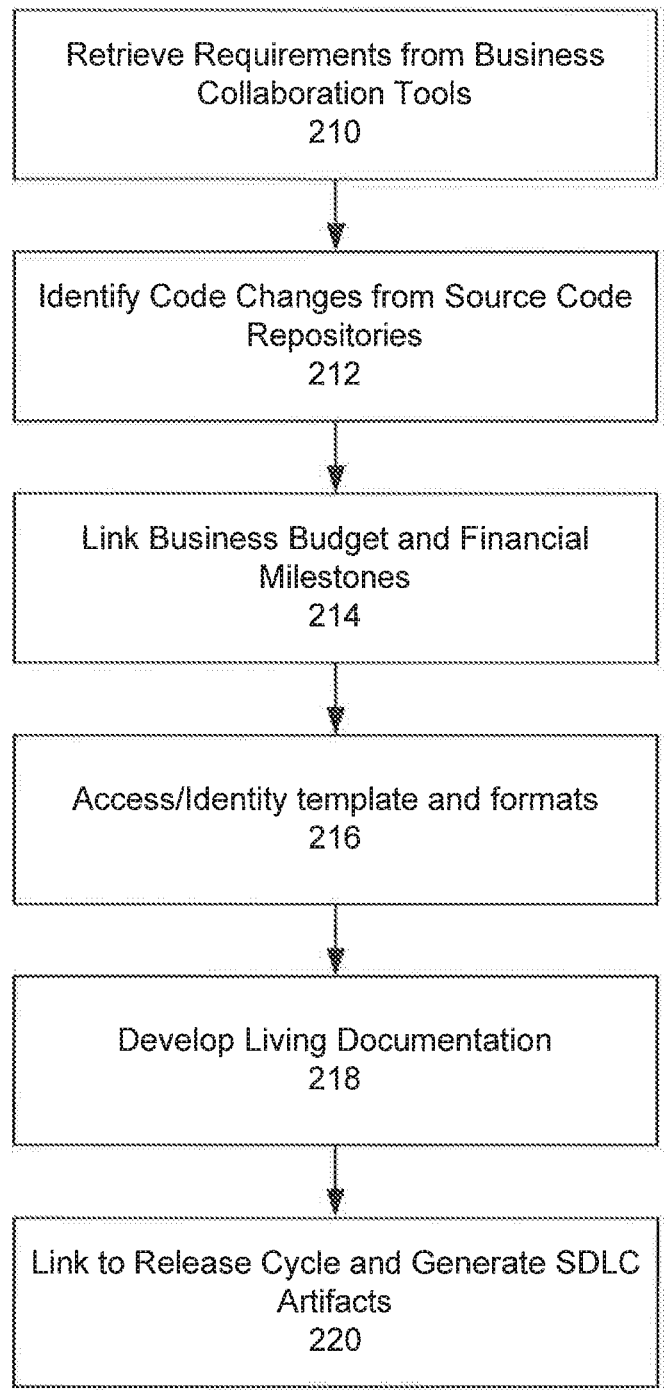
FIG. 2 is an exemplary flowchart for generating software development life cycle audit documentation, according to an embodiment of the present invention.

FIG. 2 is an exemplary flowchart for generating software development life cycle audit documentation, according to an embodiment of the present invention. At step 210, requirements may be retrieved from business collaboration tools. At step 212, code changes may be identified from source code repositories. At step 214, business budget and financial milestones may be linked. At step 216, template and/or formats may be accessed. At step 218, living documentation may be developed. At step 220, the living documentation may be linked to release cycle and software development life cycle (SDLC) artifacts may be generated for risk and audit concerns. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Each step is described in more detail below.

At step 210, requirements may be retrieved from business collaboration tools. An embodiment of the present invention may be directed to a tool (e.g., a computer program, application, etc.) that enables development teams to move from point-in-time documentation to living documentation while still satisfying software development life cycle (SDLC) audit and risk concerns. The tool may pull requirements from, for example, business/technology collaboration tools where requirements are documented, prioritized and signed off on upon completion.

At step 212, code changes may be identified from source code repositories. Code changes related to requirements may be extracted from source code repositories to determine what functional code was changed for each requirement requested by a business.

At step 214, business budget and financial milestones may be linked. An embodiment of the present invention may link the business budget and financial milestones to requirements to document who approved the business investment and high level business requests. An embodiment of the present invention may retrieve code review information from the source code repository to ensure that each code change was reviewed and approved by team members. Test code that is committed to the source code repository may be linked back to ensure that test code coverage is provided and that tests exist for each functional and non-functional requirement.

Build information may be linked from the build pipeline tool which may show each daily build, the results, and the unit test results for each build. Embodiments may also retrieve Quality Assurance (QA), User Acceptance Testing (UAT), integration, and regression test execution and results from test management system(s) and may link those tests back to the functional and non-functional requirements. Similarly, non-functional tests, such as stress tests, load tests, performance tests, security tests, etc. may be retrieved from the system of records and linked to the release and business requirements.

At step 216, template and/or formats may be accessed. Embodiments may create a template capability so audit and project management office teams can describe the format of the SDLC documentation and change the generation of that documentation as they require without impacting the business or feature teams. Thus, the description of the documentation may be separated from the extraction and mapping of the business requirements through the deployment and build of the application.

At step 218, living documentation may be developed. An embodiment of the present invention enables teams and other users to work with a living documentation instead of point-in-time documentation. With a living documentation, risk, audit, and other external stakeholders to the team may manage what documents are generated, when they are generated, the format of the documentation and other attributes and features. The underlying data may be automatically retrieved from the system of record which reduces inefficiencies. Moreover, because the business requirements are linked to code build and testing, the overall accuracy is ensured.

At step 220, the living documentation may be linked to a release cycle and SDLC artifacts may be generated for risk and audit concerns. Development teams may then document application code in living documentation, such as collaboration boards, and embodiments may then automatically link the living documentation to the release cycle, and generate the SDLC artifacts necessary to satisfy risk and audit concerns. For example, an embodiment of the present invention may store historical data relating to an application, including data elements, new features, etc.

An embodiment of the present invention may also be applied to trade bonds. For example, bond trading may be supported by an equity trading platform. When changes are detected, an embodiment of the present invention may automatically generate updated bond documentation that is relevant and current. In this case, the SDLC audit Documentation system may detect that changes were made to the binary stored in the AM (e.g., 112 step in FIG. 1). This may be determined by observing the MD5 hash of the binary and/or the latest revision number. A change in the UAT deployment (re-deploy) of the application binary may cause an embodiment of the present invention to re-generate updated documentation, by pulling from source systems and storing/archiving the documented metadata with the same updated revision number as the binary. When the revision number is requested to be deployed to production, the updated documentation that was generated may be uploaded to the required System of Record.

Figure 3:
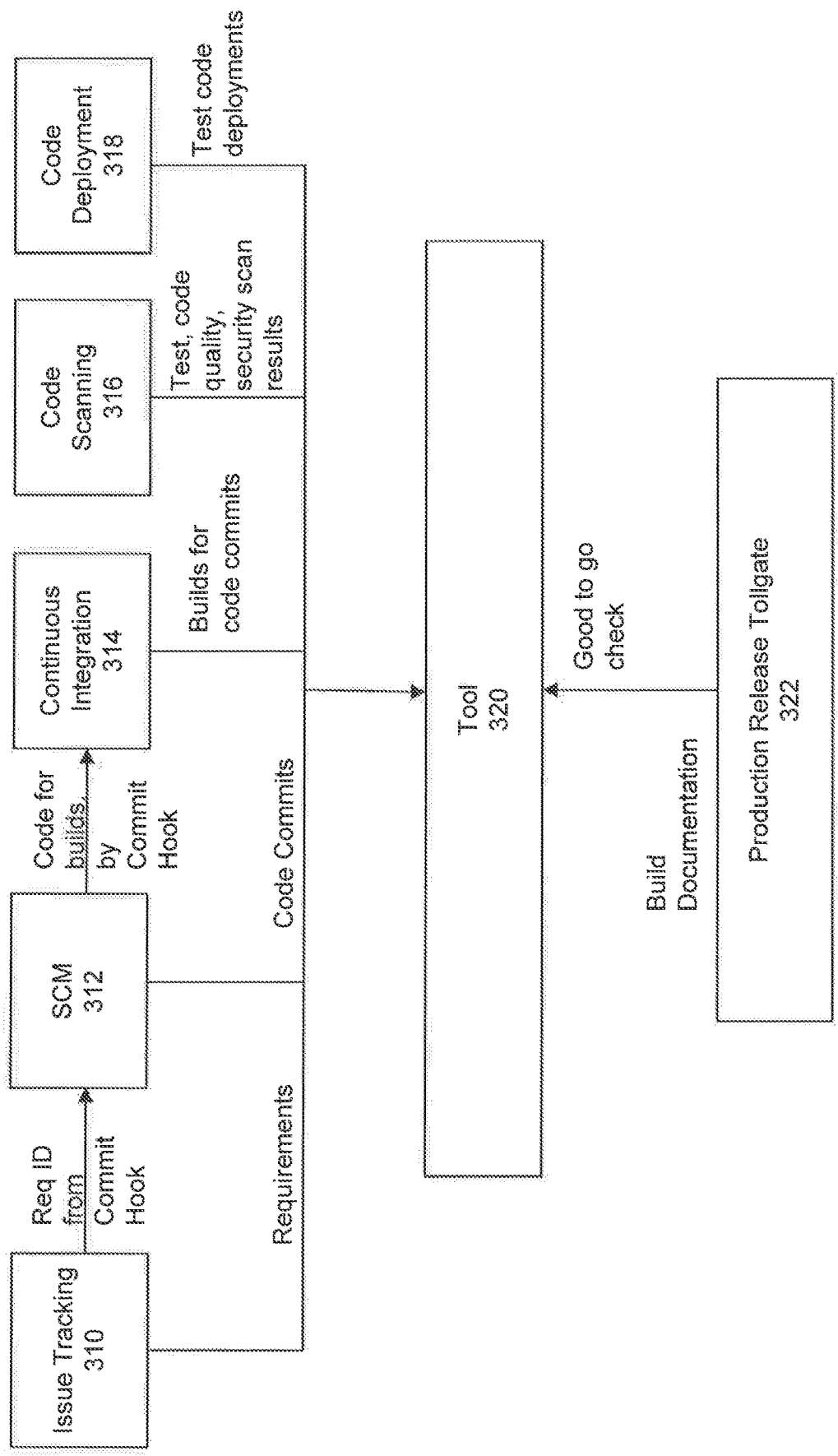
FIG. 3 is an exemplary system architecture, according to an embodiment of the present invention.

FIG. 3 is an exemplary system architecture, according to an embodiment of the present invention. As shown in FIG. 3, Issue Tracking 310 may provide requirements to Tool 320 and communicate requirement identifier to SCM 312. SCM 312 may communicate code commits to Tool 320. Continuous Integration 314 may provide builds for code commits to Tool 320. In addition, Code Scanning 316 may provide tests, code quality, security scan results to Tool 320. Code Deployment 318 may provide test code deployments to Tool 320. Production Release Tollgate 322 may provide/access build documentation to Tool 320.

Figure 4:
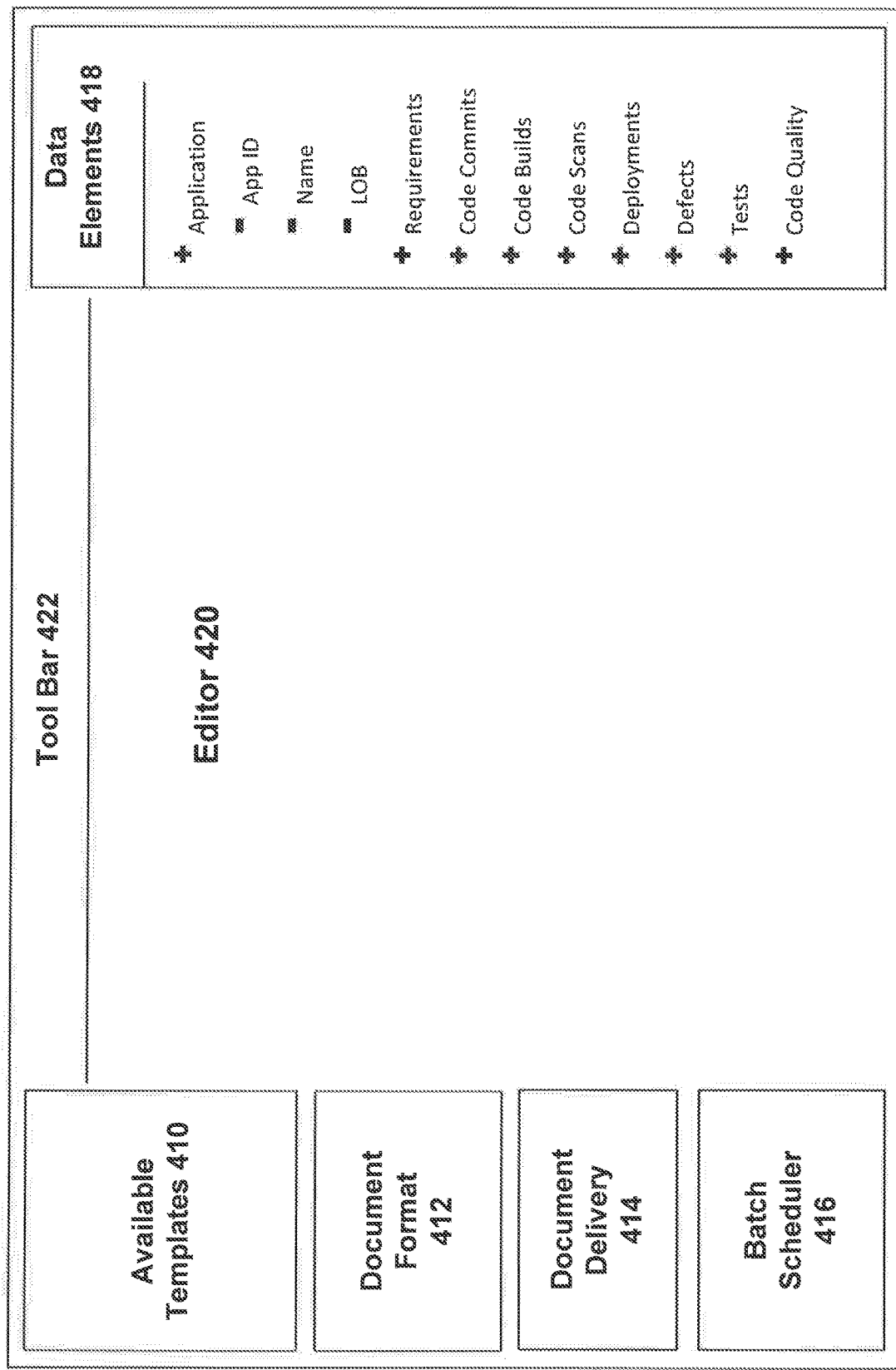
FIG. 4 is an exemplary interface, according to an embodiment of the present invention.

FIG. 4 is an exemplary interface, according to an embodiment of the present invention. As shown in FIG. 4, Interface 420 may include Available Templates 410, Document Format 412, Document Delivery 414 and Batch Scheduler 416. Users may describe and link data models through the exemplary interface shown in FIG. 4.

Available Templates 410 may include starting templates on document topic (e.g., audit), audience (e.g., FTC), compliance (e.g., FICRA), etc. Templates may extend other templates for reuse and updates. Document Format 412 may detail how to format documents and whether electronic signature and/or approval workflow may be needed. Other document features and options may be provided. Document Delivery 414 may detail where to send documents once generated (e.g., HTTPS, SFTP, etc.).

With Batch Scheduler 416, batch schedule generation may be triggered from build pipeline, a chronological schedule or other order.

Editor 420 may provide an interface where documents may be formatted and data elements may be dragged and dropped from available Data Elements 418. Other interactive features may be supported. Exemplary Data Elements 418 may include Application (e.g., Application ID, Name, LOB, etc.), Requirements, Code Commits, Code Builds, Code Scans, Deployments, Defects, Tests and Code Quality. Other data elements may be supported based on various applications that may be supported by the present invention.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for automated generation of software development life cycle audit documentation, the system comprising:
   a source code repository that stores source code;
   an interface that communications with one or more users via a communication network; and
   a computer processor, coupled to the repository and the interactive interface, configured to perform the steps of:
   retrieving one or more requirements from a business collaboration tool;
   identifying one or more code changes relating to the one or more requirements from a source code repository to determine functional code that was changed for each requirement;
   linking business budget and financial milestone data to the one or more requirements to document who approved an associated business investment;
   accessing code review information from the source code repository to ensure each code change was reviewed and approved by a team member;
   accessing a test execution and results from a test management system;
   linking the test execution and results to one or more functional requirements and non-functional requirements;
   accessing non-functional tests from one or more systems of records;
   linking the non-functional tests to one or more release and business requirements;
   applying a template that describes a format of a living documentation that automatically links to a release cycle; and
   generating the living documentation based on the template.

2. The system of claim 1, wherein test code committed to the source code repository is linked back to ensure test code coverage is provided.

3. The system of claim 1, wherein build information is linked from a build pipeline tool that shows each daily build, associated results and unit test results for each build.

4. The system of claim 1, wherein the test execution and results relate to QA, UAT, integration and regression.

5. The system of claim 1, wherein the non-functional tests comprise stress tests, load tests, performance tests and security tests.

6. The system of claim 1, wherein the living documentation is a software development software development life cycle (SDLC) documentation.

7. The system of claim 1, wherein the computer processor is further configured to perform the step of: generating SDLC artifacts to satisfy risk and audit concerns.

8. The system of claim 1, wherein the computer processor is further configured to perform the step of: documenting application code in the living documentation.

9. The system of claim 1, wherein the computer processor is further configured to perform the step of: storing the living documentation is a collaboration board.

10. The system of claim 1, wherein the computer processor is further configured to perform the step of: storing the living documentation immutably with application binaries.

11. A method for automated generation of software development life cycle audit documentation, the method comprising the steps of:
retrieving, via an input, one or more requirements from a business collaboration tool;
identifying, via a computer processor, one or more code changes relating to the one or more requirements from a source code repository to determine functional code that was changed for each requirement;
linking, via the computer processor, business budget and financial milestone data to the one or more requirements to document who approved an associated business investment;
accessing, via source code repository, code review information to ensure each code change was reviewed and approved by a team member;
accessing, via the computer processor, a test execution and results from a test management system;
linking, via the computer processor, the test execution and results to one or more functional requirements and non-functional requirements;
accessing, via the computer processor, non-functional tests from one or more systems of records;
linking, via the computer processor, the non-functional tests to one or more release and business requirements;
applying, via the computer processor, a template that describes a format of a living documentation that automatically links to a release cycle; and
generating, via the computer processor, the living documentation based on the template.

12. The method of claim 11, wherein test code committed to the source code repository is linked back to ensure test code coverage is provided.

13. The method of claim 11, wherein build information is linked from a build pipeline tool that shows each daily build, associated results and unit test results for each build.

14. The method of claim 11, wherein the test execution and results relate to QA, UAT, integration and regression.

15. The method of claim 11, wherein the non-functional tests comprise stress tests, load tests, performance tests and security tests.

16. The method of claim 11, wherein the living documentation is a software development software development life cycle (SDLC) documentation.

17. The method of claim 11, further comprising the step of: generating SDLC artifacts to satisfy risk and audit concerns.

18. The method of claim 11, further comprising the step of: documenting application code in the living documentation.

19. The method of claim 11, further comprising the step of: storing the living documentation is a collaboration board.

20. The method of claim 11, further comprising the step of: storing the living documentation immutably with application binaries.

* * * * *